Jan. 11, 1927.

P. FASSLER 1,613,987

ELECTRIC COVER DRIER

Original Filed Jan. 30, 1922    4 Sheets-Sheet 1

INVENTOR.
Peter Fassler
BY
G. H. Braddock
ATTORNEY.

Jan. 11, 1927.

P. FASSLER 1,613,987

ELECTRIC COVER DRIER

Original Filed Jan. 30, 1922    4 Sheets-Sheet 3

INVENTOR.
Peter Fassler
BY
G. H. Braddock
ATTORNEY.

Jan. 11, 1927.

P. FASSLER 1,613,987

ELECTRIC COVER DRIER

Original Filed Jan. 30. 1922    4 Sheets-Sheet 4

INVENTOR.
Peter Fassler.
BY G. H. Braddock
ATTORNEY.

Patented Jan. 11, 1927.

UNITED STATES PATENT OFFICE.

PETER FASSLER, OF BRIDGEPORT, CONNECTICUT, ASSIGNOR OF ONE-FOURTH TO ARNO SCHMIDT AND ONE-FOURTH TO ADOLPH H. C. MUELLER, BOTH OF BRIDGEPORT, CONNECTICUT.

ELECTRIC COVER DRIER.

Application filed January 30, 1922, Serial No. 532,867. Renewed December 11, 1925.

This invention has reference to electric driers, more especially to compound line cover driers.

The broad object of the invention is to provide an electric drier which will be simple and practical in construction, and which will be economical and efficient in the performance of its intended function.

A more specific object is to provide an electric drier including a plurality of feeding or transfer screws and devices capable of transporting covers, various food products to be exhausted or cooked, etc., through the drier to deliver them from the drier at a location in proximity to the location where the articles to be dried enter the drier.

A still further object is to provide in the improved electric drier a resistance plate or conveying platform capable of moving continuously through the drier and constructed to convey the articles to be dried.

A still further object is to produce an electric drier consisting of a plurality of feeding or transfer screws and a plurality of spiral feed members constructed to transport covers to be dried through the drier, and to equip the drier with an electric heating apparatus, and also with resistance members adapted to be in electrical connection with the heating apparatus and to serve as platforms for conveying the articles through the drier.

A still further object is to provide reliable feeding arrangements for positively and continuously conveying the resistance members or conveying platforms through the drier.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant to in no way limit the spirit of the invention, slight changes in details of construction and arrangement of parts being permissible so long as within the scope of the appended claims.

In the accompanying drawings forming a part of this specification;

Figure 1:
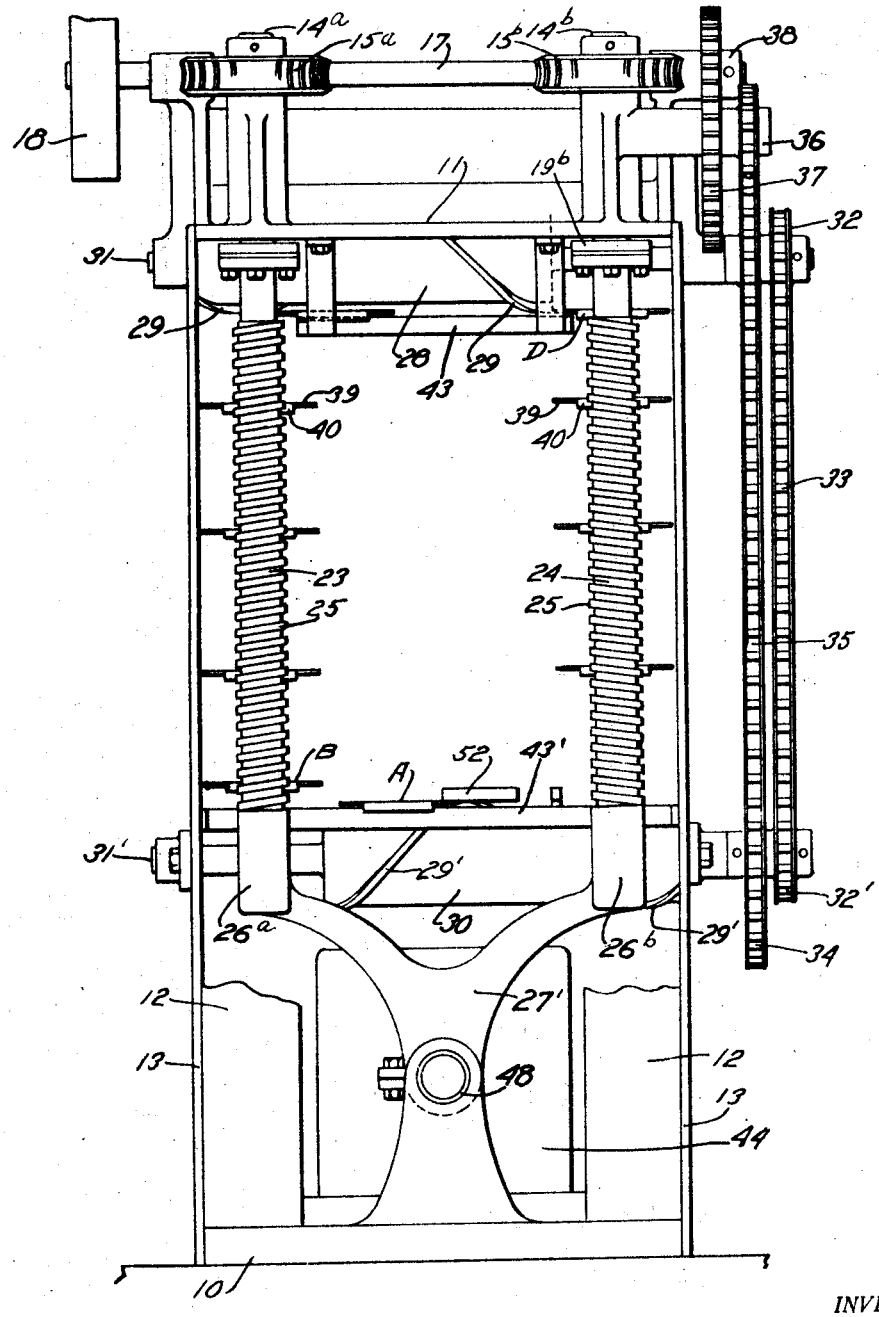
Fig. 1 is a front elevational view of the drier, parts being broken away.
Figure 2:
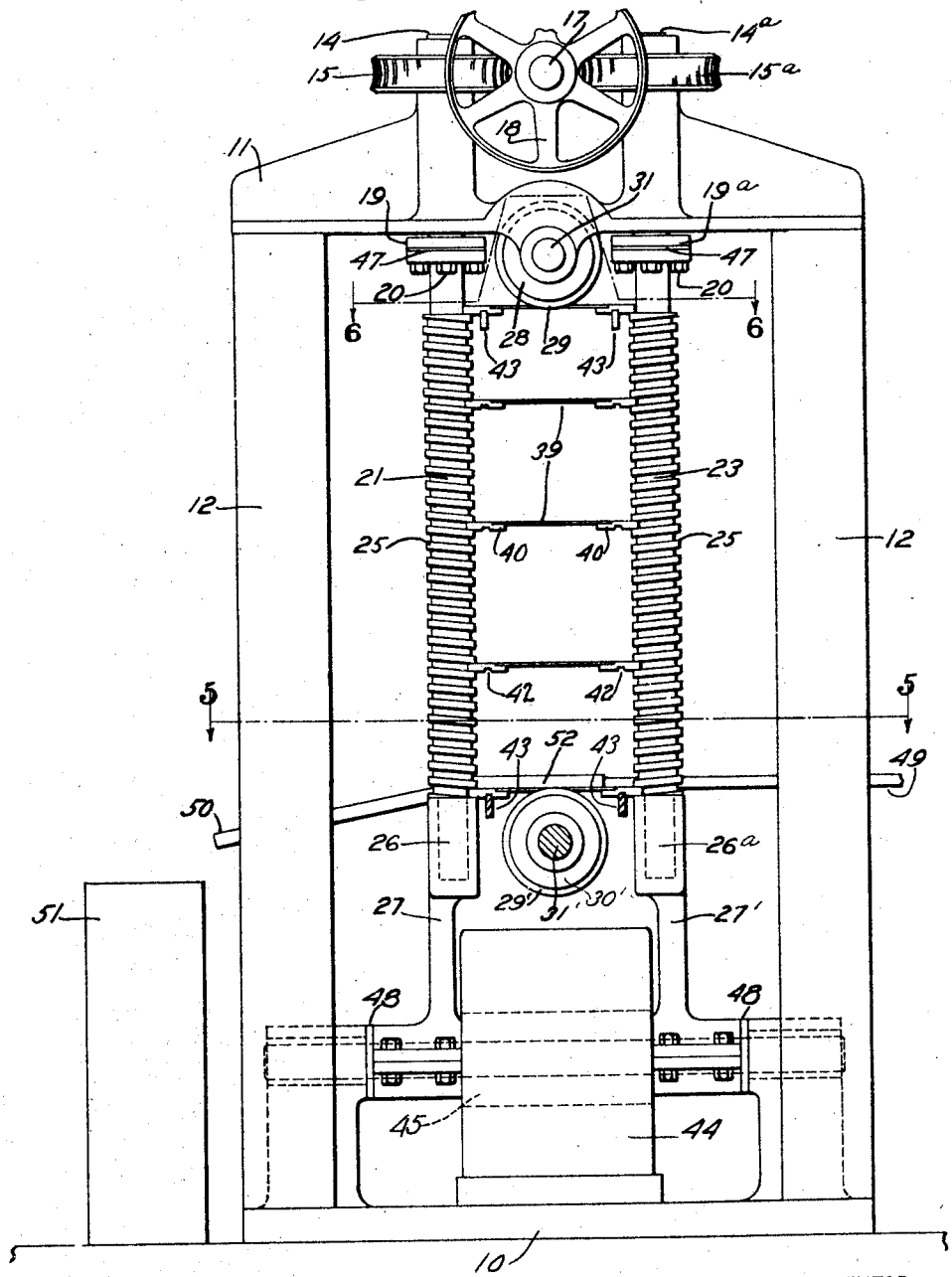
Fig. 2 is a side elevational view thereof looking from the left in Fig. 1, a part of the cover being removed.
Figure 3:
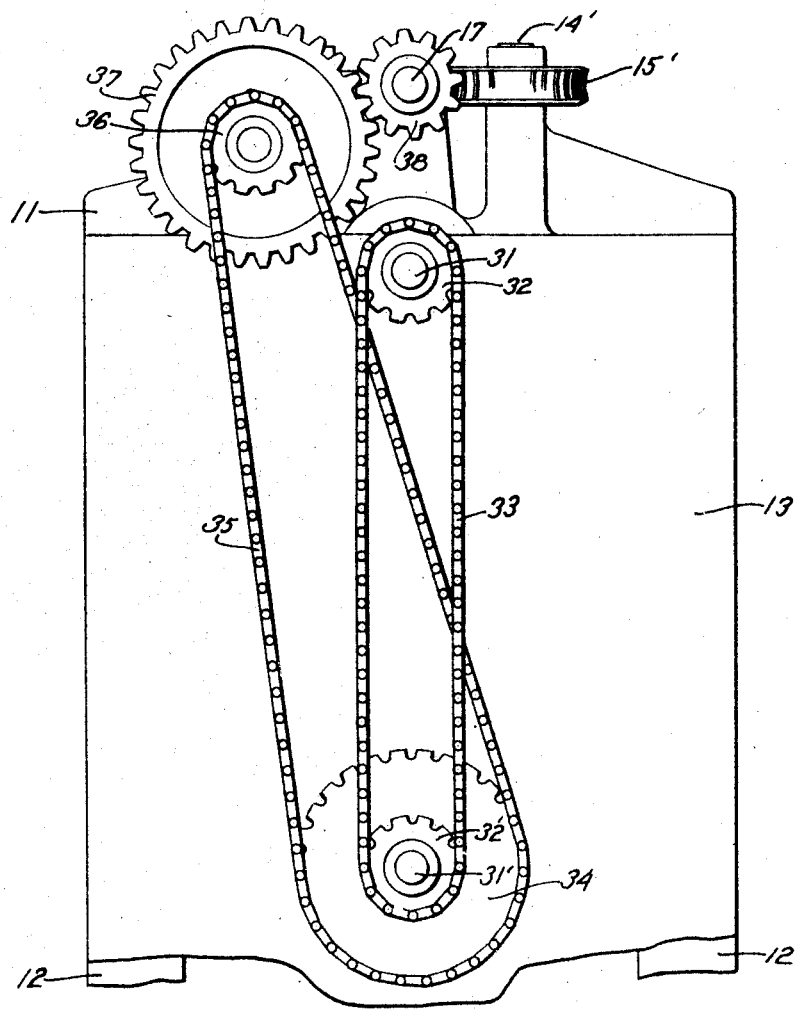
Fig. 3 is a fragmentary elevational view looking from the right in Fig. 1.
Figure 4:
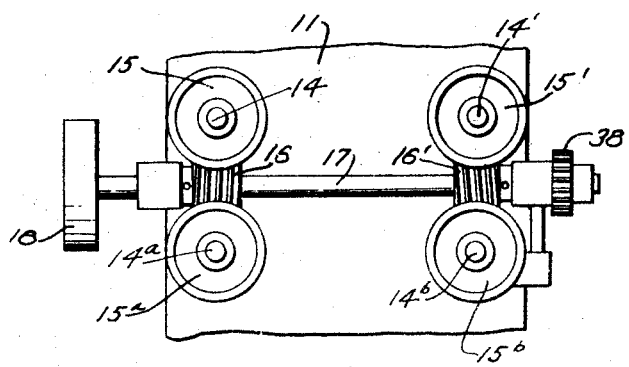
Fig. 4 is a fragmentary top plan view on a reduced scale.

Referring to the drawing in detail, the frame of the drier consists of a lower base 10, an upper base 11, and uprights 12 between the bases, there being a cover 13 surrounding the uprights and preferably entirely or partially removable in order that the interior of the drier may be viewed at any time. The upper base may likewise be partially removable.

Within the upper base are bearings for shafts 14, 14', 14ª and 14ᵇ upon the top ends of which are fixed worm gears 15 15', 15ª and 15ᵇ, gears 15 and 15ª meshing with worm 16 and gears 15' and 15ᵇ with worm 16' upon main driving shaft 17 receiving its power from any source, as by means of the pulley 18. Each of the lower ends of shafts 14 14', 14ª and 14ᵇ is provided with a flange 19 19', 19ª and 19ᵇ secured as at 20 to feeding or transfer screws 21, 22, 23 and 24 each having threads 25.

The lower ends of the transfer screws are mounted in bearings 26 26', 26ª and 26ᵇ carried by offset members 27 27', on the lower base 10.

Numeral 28 denotes a feed member mounted in the upper base 11 and having thereon a spiral 29 of non-conducting material, and numeral 30 denotes a feed member mounted in the cover adjacent the base 10, and having a similar non-conducting spiral 29'. Shafts 31 31' of the feed members 28 and 30 are provided with sprockets 32, 32' carrying a chain 33, and integral with the lower sprocket 32' is a larger sprocket 34 carrying a chain 35 which is actuated through the instrumentality of sprocket 36 and large gear 37 meshing with small gear 38 fixed upon the main driving shaft 17.

Obviously, when the pulley 18 is rotated all of the transfer screws and the feed members will be rotated.

A conveying platform or resistance plate is adapted to have continuous journey through the drier when in operation. This platform or plate is conveyed from the feed member 30 to the transfer screws 21 and 23, thence to the feed member 28, thence to the transfer screws 22 and 24, and thence to the feed member 30, whence it again goes up the transfer screws 21 and 23. The conveying platform or resistance plate and the transfer screws and spiral feed members may be of any construction suitable for the purpose. As shown, the plate or platform consists of a current resisting member 39 to the opposite edges of which are secured carriers 40 of some good conducting material and each shaped at its outer edge, as at 41, to fit the transfer screws and each having a groove 42 to receive guide members 43, 43' of non-conducting material at opposite sides of the feed members 28 and 30. The upper and lower ends of the transfer screws are suitably constructed to allow the plates or platforms to engage said screws. (Supposing a resistance platform is on the transfer screws 21 and 23 as shown in the drawing. Evidently, as said screws rotate the platform is elevated to the tops of the screws, just above the horizontal plane of the guide members 43. While in this position, the spiral 29 of the feed member 28 engages back of the platform and as the feed member 28 rotates, the platform is moved toward the transfer screws 22, 24. As the platform moves off the transfer screws 21 and 23 its grooves 42 find the upper guide members 43. Thereafter, the spiral 29 causes the platform to slide the full length of said guide members, moving the carriers 40 directly upon the upper ends of the threads 25 of the transfer screws 22 and 24 and releasing said carriers from the guide members 43. Then as the screws 22 and 24 rotate, the platform is lowered to the bottoms of the threads 25 of said transfer screws 22 and 24. Here the spiral 29' of the feed member 30 engages back of the platform, removes it from the transfer screws 22 and 24, and causes it to slide along to the transfer screws 21 and 23. The lower portions of the threads 25 of said screws 21 and 23 pick the platform up as soon as the spiral 29' has carried said platform to said screws, and the next journey of the resistance platform up the screws 21 and 23 commences.)

The feeding or transfer screws are constructed of any suitable material having good conducting properties such as bronze and the bearings 26, 26', 26$^a$ and 26$^b$ for said screws receive their current through a transformer denoted generally at 44, an electric switch 46 being for the purpose of controlling the transformer. The current is transferred into the feeding or transfer screws 21, 22, 23 and 24 which are connected alternately from positive to negative through the conveying platforms or resistance plates. In order that the electric current may not travel through the whole mechanism of the drier the feeding or transfer screws are insulated, by use of any suitable material as indicated at 47, from the shafts 14, 14', 14$^a$ and 14$^b$ and the offset members 27, 27' are also insulated from the support bearing through the fiber bushing 48. (The connection from the transformer 44 to the transfer screws is directly through the offset members 27, 27'. Evidently, there can be no leakage through the feed members 28 and 30 for the reason that the spirals 29 and 29' are of non-conducting material).

Numeral 49 represents a feed table whence the articles to be dried are placed upon the platforms or plates when on the feed member 30, and 50 represents a chute to receive the articles that are emitted from the drier and dropped into the receptacle 51. (The chute includes a guide arm 52 adjacent the feed table 49 and feed member 30 adapted to function in a manner to be described.)

Figure 5:
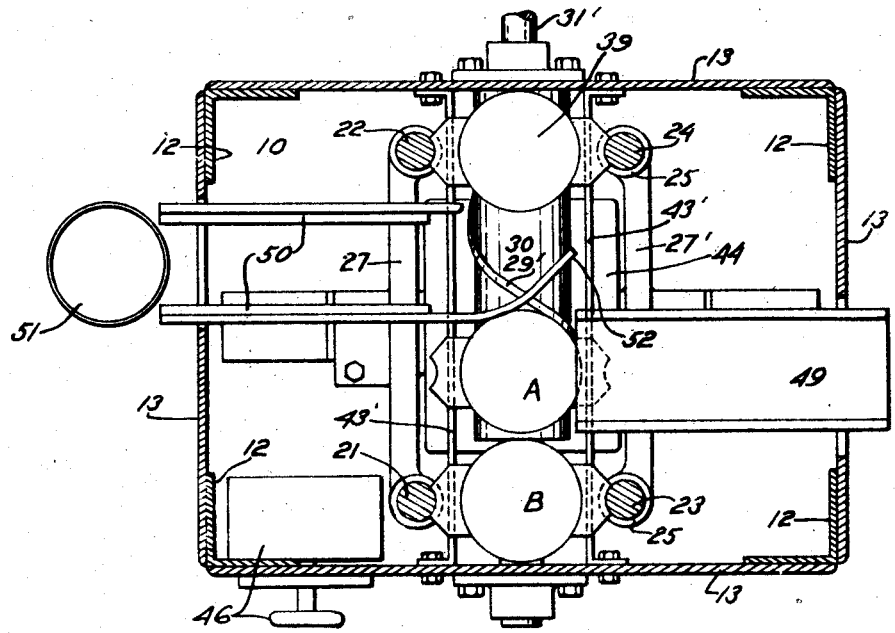
Fig. 5 is a sectional view on line 5—5 in Fig. 2, looking in the direction of the arrows.
Figure 6:
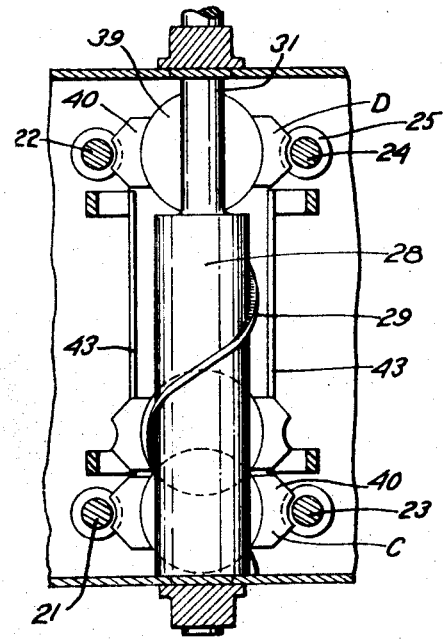
Fig. 6 is a sectional view on line 6—6 in Fig. 2, looking in the direction of the arrows.
Figures 7, 8:
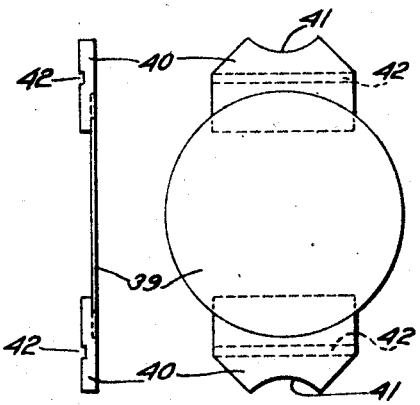
Figs. 7 and 8 are an edge and a plan view, respectively, of the conveying platform or resistance plate of the drier.

Referring more particularly to Fig. 5, it is to be remarked that the articles to be dried are placed upon the conveying platforms or resistance plates when at the position A in said figure. (That is, upon the guide members 43' adjacent the transfer screws 21 and 23, moving toward said transfer screws). Immediately the spiral 29' of the feed member 30, engaging the rearward edge of the conveying platform or resistance plate, moves the same in ordinary manner until said platform or plate properly engages the feeding or transfer screws 21 and 23, as shown at B in Fig. 5. When the transfer screws have elevated the conveying platform or resistance plate to the top of said screws, the position at which they are shown at C in Fig. 6, the spiral 29 of the upper feed member 28 transports the platform or plate along the upper guide members 43 to the upper ends of the feeding or transfer screws 22 and 24, as at D, the platform or plate being made to engage said screws in about the manner already described. The platform or plate is now carried down to the feed member 30, and thus again to the transfer screws 21 and 23. The guide arm 52 adjacent the feed member 30 is constructed and arranged to allow the platforms or plates to pass under it, but to strike the dried articles off the platform or plate, said articles passing down the chute 50.

It will be evident, that any number of platforms or plates may be passing through the machine at the same time.

Having thus fully described the invention, what I claim as new and desire to secure by Letters Patent is:—

1. An electric drier having a transfer screw adapted to transport articles to be heated, and electric means for heating said articles, the heating means being adapted to travel on said transfer screw.

2. An electric drier having a plurality of transfer screws and a plurality of feed members, said screws and members being adapted to transport articles to be heated, and electric means for heating said articles, the means being capable of continuous travel upon all of said screws and feed members.

3. An electric drier having a plurality of transfer screws and a plurality of feed members, said screws and members being adapted to transport articles to be heated, and electric means for heating said articles, the articles being capable of continuous travel upon all of said screws and feed members.

4. An electric drier having transfer screws and feed members, and a resistance platform adapted to be transported by said screws and members to convey articles to be heated through said drier, the resistance platform being capable of continuous travel upon said screws and feed members.

5. An electric drier having transfer screws and spiral feed members, a resistance platform adapted to be transported by said screws and feed members to convey articles to be heated, means whereby said platform can travel continuously through said drier, and means for removing the articles from said platform and emitting them from the drier.

6. An electric drier having transfer screws and spiral feed members, a resistance platform adapted to be transported by said screws and feed members to convey articles to be heated, means whereby said platform can travel continuously through said drier, and a guide member for removing articles from the platform when they have made one continuous passage through the drier.

7. An electric drier having transfer screws and spiral feed members, a resistance platform adapted to be transported by said screws and members and to convey articles to be heated, means whereby the travel of said platform through the drier can be continuous, said platform adapted to receive articles to be heated when at a certain station, and means for emitting said articles from the drier after they have been properly heated.

8. An electric drier having vertically arranged transfer screws and horizontally arranged spiral feeding members, a resistance platform adapted to convey articles to be heated, means whereby said platform can travel continuously upon said screws and spiral feeding members, one of said feeding members having a station at which articles to be heated are placed upon the platform, and a guide member for emitting articles from the drier when they have been properly heated.

9. An electric drier consisting of a plurality of transfer screws, a plurality of feeding members, a platform adapted to have continuous travel upon said screws and members, said platform arranged to transport articles through the drier, and means for passing an electric current through said platform to heat articles, said platform constituting a resistance member.

10. An electric drier consisting of a plurality of transfer screws, a platform adapted to be transported by said screws, said platform constituting a resistance member, and means for passing an electric current through said platform to heat the same.

Signed at Bridgeport, in the county of Fairfield and State of Connecticut, this 28th day of January A. D., 1922.

PETER FASSLER.